May 5, 1964  J. SANON  3,131,944
PISTON RING STRUCTURE
Filed April 26, 1961

*INVENTOR.*
JOSEPH SANON
BY Fred C. Fuljohn
ATTORNEY

United States Patent Office 3,131,944
Patented May 5, 1964

3,131,944
PISTON RING STRUCTURE
Joseph Sanon, P.O. Box 262, New Philadelphia, Ohio
Filed Apr. 26, 1961, Ser. No. 105,587
3 Claims. (Cl. 277—139)

The present invention generally relates to piston rings for internal combustion engines. More specifically, this invention relates to a three-piece piston ring which utilizes an intermediate expansion member to urge two outer cylinder-contacting rings outwardly from a piston.

The prior art has provided numerous types of piston rings composed of a plurality of parts or sections. The use of a center expander ring has been used in such combinations. However, the concept of utilizing two or more sections to provide a piston ring has been accompanied by various disadvantages. One of the primary disadvantages has been in connection with the construction of expander rings. Attempts to provide means for the outward expansion of the expander ring have resulted in numerous complex configurations for the expander ring which complicated both the forming and fabrication thereof. The complexity of expander rings often necessitates costly multiple machining operations. Another disadvantageous characteristic of the multiple section rings has been the unavoidable relative movement between the parts thereof, usually resulting in reduced ring efficiency due to the excessive wear caused by friction between the parts.

Most prior art multiple section piston rings have provided no means to prevent relative movement of the sections with respect to the expander ring. As a result the gaps of the respective sections often become aligned so that excessive loss of compression and leakage of oil into the combustion chamber will result. Prior attempts to restrict relative movement of the ring sections have involved the concept of interposing portions of one ring within the gap of another ring. However, such arrangements suffer from the disadvantage that the gap must be of sufficient size to receive the interposed portion and this results in an additional opportunity for oil and compression losses.

It is therefore a primary object of this invention to provide a three-piece piston ring which prevents relative movement between the parts of the ring and yet retains the proper expansion action needed to provide the sealing action for the piston ring.

Another object of the present invention is to provide a construction which will increase the efficiency of the ring by preventing alignment of the gaps.

It is further an object of this invention to utilize spring steel to replace the complicated spring producing structure provided in prior art expander rings.

In addition and in conjunction with the above-noted objectives, this invention also has as objectives the provision of a strong, durable, highly efficient piston ring which is comparatively simple in construction, reliable in use and low in manufacturing cost.

These and other objects and advantages will become more apparent after reading the following detailed description in conjunction with the drawings.

It is believed that the invention in its broadest concept involves a piston ring assembly comprising:

(a) an expander ring having a generally cylindrical shape, (b) the upper and lower edge surfaces of said expander ring comprising a plurality of alternately spaced raised sections and depressed sections, (c) two engaging rings which are adapted to cooperate with said expander ring, one at the upper edge surface of said expander ring and one at the lower edge surface of said expander ring, (d) said two engaging rings being disposed in spaced planes which are perpendicular to the axis of said expander ring, (e) each of said engaging rings having an interior periphery consisting of a plurality of alternately spaced projections and recesses, (f) the projections and recesses of said engaging rings being engaged respectively with the depressed sections and raised sections of said expander ring.

Referring now more specifically to a specific embodiment of the invention, it will be seen that:

Figure 1:
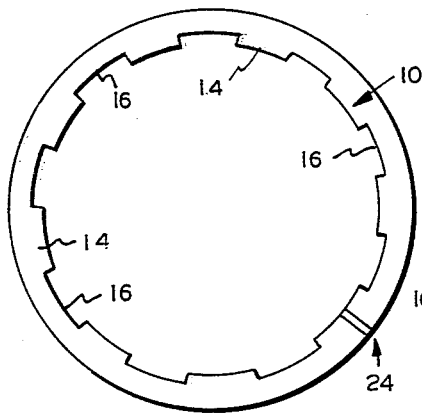
FIGURE 1 is a plan view of a cylinder engaging ring in accordance with this invention.

Referring to the drawings for a more specific description of the invention, in FIGURE 1 of a cylinder engaging ring 10 is shown, having a plurality of alternate projections 14 and recesses 16 arranged around the inner periphery of the ring. A ring gap 24 is also shown.

Figure 2:
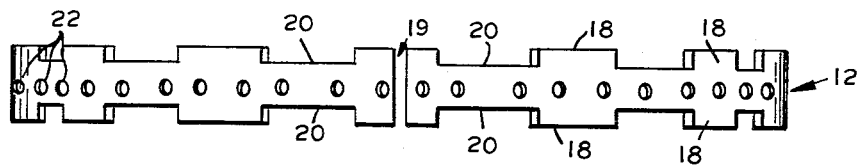
FIGURE 2 is an elevation view of an expander ring in accordance with this invention.

Referring to FIGURE 2, a spring steel expander ring 12 is shown having a plurality of alternate projections 18 and recesses 20 arranged around the upper and lower surfaces of the expander ring. These expander ring projections 18 and expander ring recesses 20 are spaced so that they can be aligned with the projections 14 and recesses 16 of two cylinder engaging rings 10. Also shown in FIGURE 2 are oil drainage vents 22, which are included in this particular embodiment of the invention. Expander ring gap 19 is also visible.

Figure 3:
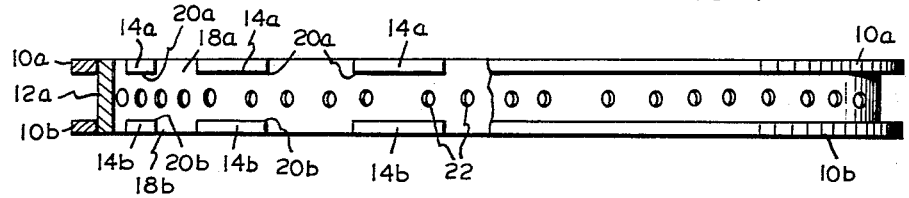
FIGURE 3 is an elevation view, partly broken away, of a piston ring assembly in accordance with this invention.

Referring now to FIGURE 3, in which the invention is shown in its assembled form (but with the front left quarter broken away), cylinder engaging rings 10a and 10b are shown with the inner periphery projections 14a and 14b engaged within the expander ring recesses 20a and 20b of expander ring 12a and secured with respect to relative circumferential movement by means of projections 18a and 18b.

Figure 4:
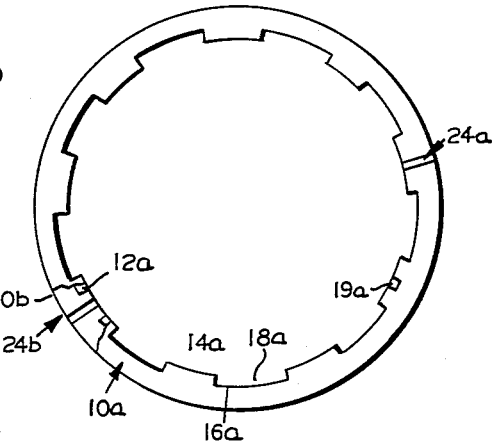
FIGURE 4 is a top plan view of a piston ring in accordance with this invention in its assembled form with a cutaway section showing orientation of the lower ring gap.

Another view of the assembled invention is shown in FIGURE 4 wherein the relative location of the expander ring 12a with respect to cylinder engaging rings 10a and 10b is shown and from which it will be obvious that the expander ring 12a is capable of exerting a radially outward force. In this view the inwardly extending projections 14a of ring 10a and the upwardly extending projections 18a of ring 12a, as well with their respective recesses, are seen in their dove-tailed interlocking positions. The prevention of relative movement between rings 10a and 10b is seen to orient the ring gap 24a of ring 10a, ring gap 19a of ring 12a and the ring gap 24b of ring 10b so that they are positioned at spaced apart intervals thus minimizing accidental vertical alignment of all these gaps.

Figure 5:
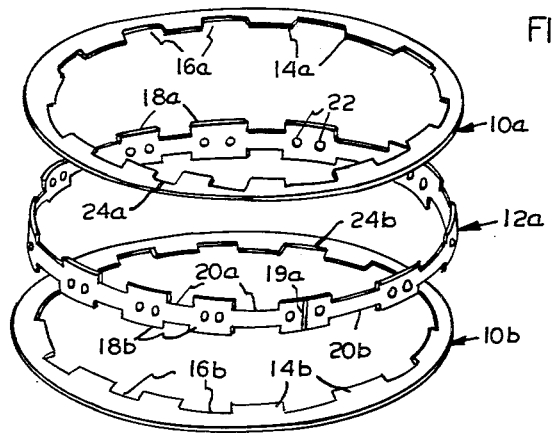
FIGURE 5 is an exploded, perspective view of a piston ring assembly in accordance with one embodiment of the present invention.

In FIGURE 5 the cylinder engaging rings 10a and 10b are shown separated from the expander ring 12a and this view further illustrates the alignment of the inner peripheral projections 14a and 14b with the expander ring recesses 20a and 20b and the corresponding alignment of inner peripheral recesses 16a and 16b with expander ring projections 18a and 18b. It will also be noted in this view that the arrangement of ring gap 24a, ring gap 19a and the ring gap 24b of cylinder engaging ring 10b are such that they are located at spaced intervals so as to thereby accomplish the previously mentioned objectives.

The elements of this invention are preferably made of spring steel, and particularly the expander ring. The simple annular form of the expander ring is seen to be such that a stamping press can easily perform the manufacturing processes. This in turn facilitates fabrication. When the expander ring, made of spring steel, expands, it locks together all three portions of the assembly in a rigid fashion by a dovetailing operation. The upper and lower rings can be thin in comparison to the center expander ring if desired.

While the above description provides a detailed disclosure of one embodiment in accordance with this invention, it is to be understood that the invention is not limited to the details of the foregoing disclosure. It is realized that modifications and variations of the invention could readily be made by those skilled in the art without departing from the spirit of the invention. For example, the specific shape of the interlocking portions of the rings could be varied while still retaining the combined functions of radial expansion and restriction of circumferential rotation.

What is claimed is:

1. A piston ring assembly comprising:
    (a) a generally circular expander ring having the shape of a section of a cylinder,
    (b) the upper and lower edge surfaces of said expander ring comprising a plurality of alternately spaced raised sections that extend only in directions that are parallel to the axis of said cylindrically shaped expander ring and depressed sections,
    (c) two entirely flat engaging rings which are adapted to cooperate with said expander ring, one at the upper edge surface of said expander ring and one at the lower edge surface of said expander ring, each of said flat engaging rings lying entirely in separate planes,
    (d) said two entirely flat engaging rings being disposed in spaced apart parallel planes which are perpendicular to the axis of said expander ring,
    (e) each of said entirely flat engaging rings having an interior periphery consisting of a plurality of alternately spaced projections and recesses that extend only in the plane of its respective engaging ring,
    (f) the projections and recesses of said entirely flat engaging rings being engaged respectively with the depressed sections and raised sections of said expander ring at essentially right angles.

2. A structure according to claim 1 wherein said expander ring is provided with a plurality of oil holes.

3. A structure according to claim 1 wherein said expander ring is constructed of spring steel.

References Cited in the file of this patent

UNITED STATES PATENTS

| | | |
|---|---|---|
| 2,369,263 | Teetor | Feb. 13, 1945 |
| 2,527,958 | Phillips | Oct. 31, 1950 |
| 2,742,334 | Phillips | Apr. 17, 1956 |

FOREIGN PATENTS

| | | |
|---|---|---|
| 536,852 | Great Britain | May 29, 1941 |